Feb. 5, 1963  B. H. DOYLE ETAL  3,076,586
CONVERTIBLE MULTIPLE-USE AUTOMATIC TAPE DISPENSING ASSEMBLY
Filed Oct. 8, 1959  10 Sheets-Sheet 1

Inventors:
Britton H. Doyle,
Arnold J. Eisenberg
John F. McDermott, Jr.
by Emery, Booth, Townsend, Miller & Widner Attys

Feb. 5, 1963 B. H. DOYLE ETAL 3,076,586
CONVERTIBLE MULTIPLE-USE AUTOMATIC TAPE DISPENSING ASSEMBLY
Filed Oct. 8, 1959 10 Sheets-Sheet 4

Inventors:
Britton H. Doyle,
Arnold J. Eisenberg,
John F. McDermott, Jr.
By Emery, Booth, Townsend, Miller + Weidner Attys

United States Patent Office 3,076,586
Patented Feb. 5, 1963

3,076,586
CONVERTIBLE MULTIPLE-USE AUTOMATIC
TAPE DISPENSING ASSEMBLY
Britton H. Doyle, Arnold J. Eisenberg, and John F. Mc-
Dermott, Jr., Nashua, N.H., assignors to Nashua Cor-
poration, Nashua, N.H., a corporation of Delaware
Filed Oct. 8, 1959, Ser. No. 845,126
8 Claims. (Cl. 226—101)

This invention concerns machines and equipment for dispensing lengths of adhesively conditioned tape from roll supplies, for packaging, sealing, labelling and other purposes, more particularly tape of the moisture-activated or dry-gummed type.

A primary object is to provide an electric power-operated machine of the stated class constructed and arranged for and equipped with electric circuitry and operating controls whereby it may be set up for use in various different manners according to the tape-dispensing requirements of the user.

Such requirements for example may be for miscellaneous tape lengths over a substantial length range with capacity for rapid shifting as to length selection. For other users the requirement may be for selective delivery of one of a plurality of set lengths such as short and long lengths as appropriate for the girth and the length respectively of a batch of packages of like size. Again the requirement may be for repeat delivery of a selected length with automatic repeat cycling for the successive servings. Other operational capacities desirable under certain use circumstances are the deliveries of preselected, or of continuous or of random lengths of the tape. And in conjunction with these different operative arrangements there may be a preference for manual start-control readily accessible to the hand of the operator who may be variously stationed near the machine, or for foot-operable start-control so as to free both hands of the operator for other activity.

With the foregoing and other objects in view as will become apparent, the invention provides a powered tape dispenser or strip server comprising a main frame and parts assembly for supporting a tape roll supply and feeding, measuring, moistening, cutting off and presenting the desired tape lengths, together with electric operating and control circuits having plug-in prong and socket connections for installation of different control sub-assemblies and associated interchangeable parts for readily converting as between the various operational capacities or phases for the base machine Thus it will be understood that the correlated apparatus as a whole comprises a main or base machine together with a plurality of interchangeable controls and certain associated parts or sub-assemblies any of which is adapted for plug-in type of installation upon the base machine to suit the given operational requirements. The invention herein comprises the group or multiple set of controls and associated parts having the correlated nature of a kit, together with the construction, arrangement and adaptation of the base tape dispenser machine to accommodate the different controls, and the novel assembly of the base machine with each of them.

Accordingly the description and drawings in the entirety disclose one embodiment of such base power-operated tape dispenser variously interchangeably provided with the particular controls of the over-all group or kit thereof.

Tape dispensing machines or strip servers as concerned in the present invention generally comprise a support for a roll supply of the tape and from which the tape is advanced along a path to and between feed rolls and past a means for adhesively conditioning one face of the tape en route to the delivery point, means being provided for cutting off the desired length of the delivered moistened or otherwise adhesively conditioned tape. The present invention is more particularly concerned with a motorized or power-driven machine of the class described. The base machine chosen for illustrating the multiple combinational controls comprised in the overall apparatus of the invention is in general similar to that of U.S. Patent 2,776,833 of January 8, 1957, to which reference may be made for more detailed description of the main feeding, moistening and severing means herein sufficiently shown for locating the control features in conjunction therewith for an understanding of the several operational phases for the base machine as presented by the invention.

Figure 6:
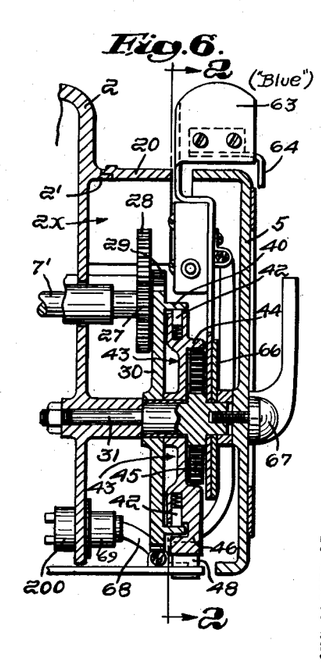
FIG. 6 is a vertical transverse section through the control housing compartment as at the right in FIG. 5.

Throughout the several views the base machine comprises a main frame or housing 1 including laterally spaced vertical side members 2, 2 on and between which the tape-engaging mechanism is mounted. At the rear of the machine the housing provides a tape holder well 3 for a tape supply roll R, FIG. 1. The tape from the supply roll is advanced along a path between the frame sides to the delivery station S at the opposite or forward end of the machine, that at the left in the several side elevational views hereof. Feeding of the tape is accomplished by opposed rotary feed wheels or rolls, FIG. 3, including a motor-driven feed roll 6 and a parallel opposite and herein upper feed roll 7. The first-mentioned roll 6 is driven from an electric motor M, FIG. 13, through reduction gearing in a gear housing 8 at the left side of the machine in generally similar fashion as in said Patent 2,776,833. The other or upper feed roll 7 of the pair is freely rotatably mounted on one arm of a bell crank (not shown) pivoted on the frame for bodily shifting movement in axial parallelism with the driven roll 6 into and out of tape feeding relation to it for starting and ending each tape delivery cycle. One end of the shaft 7' of the upper or measuring feed roll 7 is seen in FIG. 6.

Figures 3, 4:
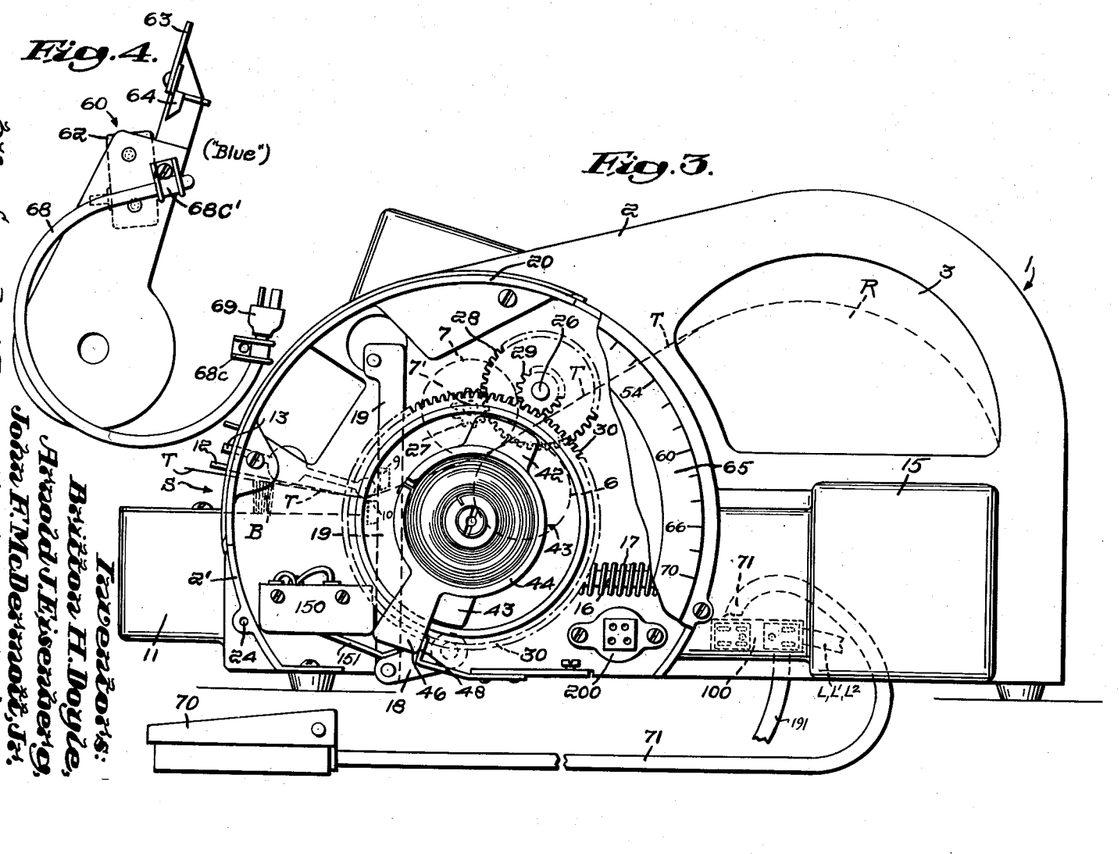
FIG. 3 is a view like FIG. 1 with the major part of the side cover plate or control housing cover removed or broken away.
FIG. 4 shows separately a control device of the FIGS. 1 to 3 operational phase.

On FIG. 3 the path of the tape is indicated by the broken line T, extending from the supply roll R forwardly past suitable guides and between the feed roll pair to a cutter or severing means, such as guillotine type as in Patent 2,776,833, comprising a movable blade 9 in tape-severing relation to the fixed blade 10, beyond which the tape passes with gummed face down across a brush moistener B. FIG. 3, projecting from a liquid reservoir 11, the tape being caused to traverse the brush in moistening relation to it as by the overlying guide platen 12 depressed by an adjustable weighting element 13.

Figures 1, 2:
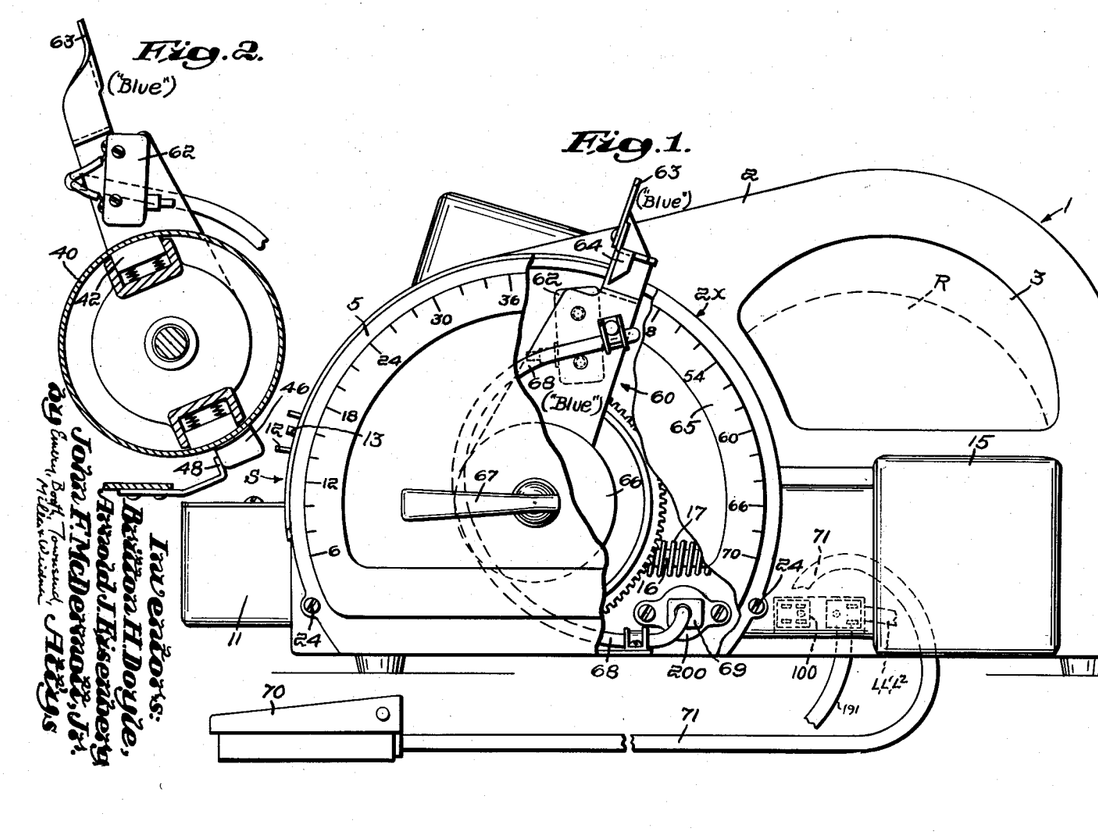
FIG. 1 is a side elevation of a base machine in one arrangement or set-up for delivery of selective single tape lengths.
FIG. 2 is a side elevational view partly in section, looking from the opposite side from that of FIG. 1, of a control element of the FIG. 1 assembly, as if on the line 2—2 of FIG. 6.

As in the mentioned patent the normally separated feed rolls 6, 7 are closed into feeding relation with the tape at the start of an operating cycle, and the movable blade 9 is elevated to clear the tape path, as by a solenoid-operated actuator rod 16, FIGS. 1 and 3. The latter is shiftable lengthwise, toward the right in the views, by the solenoid designated generally 15, and upon release thereof to return reversely under loading by the spring 17, thereby readying the parts for the succeeding operating cycle. The forward portion of the actuator 16 is connected to one arm of the mentioned bell-crank on the other arm of which the upper feed roll 7 is mounted, and also is connected to another two-arm lever of which the lower arm 18, as seen at the lower portion of FIG. 3, is connected to a lifter rod 19 for actuation of the movable knife 9.

Main operational functions of the base machine, similarly as in the mentioned patent, will be understood as including the movement of the opposed feed rolls 6, 7 relative to each other to and from tape feeding relation; the motorized driving of at least one of the feed rolls when in the feeding relation; and the operation of the cutter means to sever the fed tape lengths, usually with a preparatory clearing action of the movable shear blade of the cutter mechanism to insure that the tape path is free for delivery of the tape when any feed cycle is commenced.

As indicated, the functions of closing the normally separated feed rolls 6, 7 for effecting the feed, and that of clearing or arming the knife 9 for the cut-off action are accomplished by the solenoid 15 upon energizing thereof, with opposite return motions under the action of the spring such as 17 associated with the actuator rod 16 of the solenoid. The driving of the feed rolls is accomplished by the motor M through reduction gearing in the gear housing 8 operatively connected to the herein lower feed roll 6. While the motor may be continuous running through successive feed cycles, preferably and as herein illustrated it is disposed in a circuit whereby it is started and stopped for each feed cycle, the motor unit being of the known type selected for frequent start and stop operation, with or without associated brake means.

For determining the selected lengths of tape of be fed, the base machine includes length gauging means, and associated switch trip mechanism whereby upon delivery of the desired length or lengths within the available range the operating cycle is halted. Such length gauging means may in general and except as otherwise pointed out be herein substantially as in the mentioned patent, herein including a train of gearing operatively associated with the herein upper and bodily shiftable feed roll 7, the latter being moved in synchrony with and by the tape as it is advanced through the feed roll pair when in feeding relation at the opposite faces of the tape.

Noting FIGS. 1, 3 and 6 to 12, such gearing herein comprises a pinion 27 angularly fixed coaxially with the length-gauging upper feed roll 7 and meshing with an intermediate gear 28 on a cross-shaft 26 on the machine frame. Concentrically fixed with the intermediate gear 28 is another pinion 29 meshing with a large gear 30 rotatable on a bearing stud 31 on the machine frame. The gear 30 together with parts associated with and moving with it constitutes a length control element having a reduced angular movement directly proportional to the length of tape fed between the active feed rolls 6 and 7. The described gear train between the upper or measuring feed roll 7 and this length control element or gear 30 receives a substantial reduction, such that the maximum tape length selection for the given machine, up to say 72 inches or more, is proportionately expressed by not more than one full 360° rotation of the gear 30, herein somewhat less. As explained later, provision is also made for obtaining random lengths and for continuous longer lengths when desired.

Thus in association with the primary gauging member, namely the upper feed roll 7, the relatively large gear 30 has a reduced angular and peripheral linear movement proportioned to the actual length of tape as fed. The ratio, for calibration purposes, may by way of example be 3° of turn of the gear 30 to one inch of tape delivery.

Noting particularly FIG. 6, this measuring gear 30 carries coaxially at the outer face a laterally projecting annular flange or friction-driver 40. Free on the same stud 31 with the gear 30 and said drive flange 40 is a rotary trip member designated generally at 43. It is in constantly engaged yieldable friction-driven relation to said driver 40 as by means of spring-pressed shoes 42 so as normally to turn with said driver element 30, 40. This trip member 43 comprised in the rotary feed-length control has a central disc portion at the outer face of which a lateral annular flange 44 defines a housing drum for a convolute spring 45 of the clock type. The inner end of this spring is anchored to an enlargement on the stationary stud 31 which it surrounds while the outer end is fastened to the trip member 43; see FIG. 3.

Figure 8:
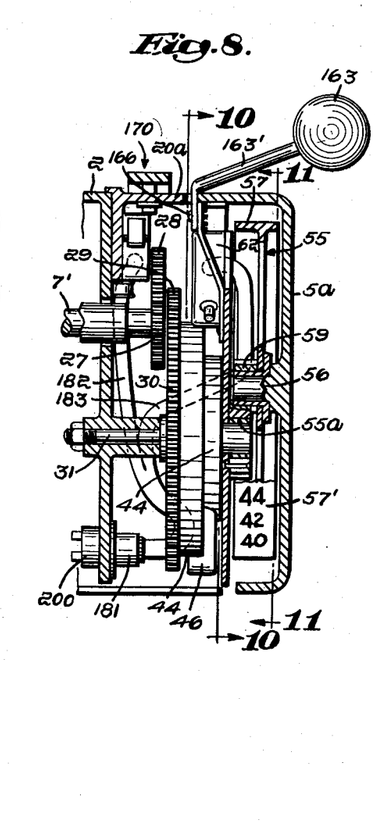
FIG. 8 is a transverse vertical section as on the line 8—8 of FIG. 7.

The drum-like trip element 43 carries a radial projection or finger 46, FIGS. 3, 6 and 8, constituting the trip proper for determining the starting and knock-off positions for the feed length control.

Through the described friction-drive connections 40—42 the trip member 43 having the outer end of the clock spring 45 affixed to it will under all normal operations be driven as a unit with the length-measuring gear 30. During the active feed of tape this unit is rotated, clockwise on FIGS. 1, 3, 7, 11 and 12 (counterclockwise on the opposite-facing view, FIG. 10). During the feed operation this rotation of the trip member 43 is in the direction to tension-wind the spring 45. When the tape to the desired length has been fed in any given operating cycle, automatic de-energizing of solenoid 15 and resultant separation of the feed rolls 6, 7 releases this rotary length measuring mechanism including the trip member 43 for return to a zero starting position under the influence of the clock spring 45. The non-driven feed roll 7 operated from the tape, and from which said trip member 43 is driven is entirely free to turn reversely for this purpose, upon separation of the feed rolls at the end of each feed.

The zero positioning for the start of each tape feed, and the control of the feed stopping action, are determined by the radial finger 46 of the trip member 43. In the inactive zero or starting position of the parts as seen in FIG. 3, said trip finger 46 stands against a fixed but preferably adjustable stop 48 on the machine frame 2. In the course of an operating cycle the finger 46 turns with the trip 43 and gear 30 away from said stop 48 under the described length-measuring action.

The mechanism described to this point is comprised in what is herein at times referred to as the base machine, which under the convertible multiple selective control aspect of the present invention is specially constructed and equipped to be supplied and used in different hook-ups and arrangements interchangeably as particular use circumstances may dictate. Other novel characterizing features of the base machine will be apparent from the description and drawings as a whole. For example, the described feed length gauging parts and gearing while contained in a gear compartment 2x at one side of the machine, herein the right side, in similar general fashion as in said Patent 2,776,833, the adjacent side frame 2 and the gear compartment-defining lateral flange 2' thereof are provided with a recessed portion at the top and front presenting a seat for interchangeable compartment-flange segments such as 20 of FIGS. 1 to 6 and others and 20a of FIGS. 7 to 11. Likewise the machine frame at the gear compartment 2x and the lateral flange 2' thereof are adapted to receive interchangeably different side cover plates such as 5 of FIGS. 1 to 6 and others and 5a of FIGS. 7 to 11. As noted, other novel provisions for the base machine common to all the views will be noted in the further description, including for further example that of the circuit junction box and plug-in connections accommodating a special relay as desirable in connection with the controls for the dual selective length phase of FIGS. 12 and 13.

Figures 7, 9:
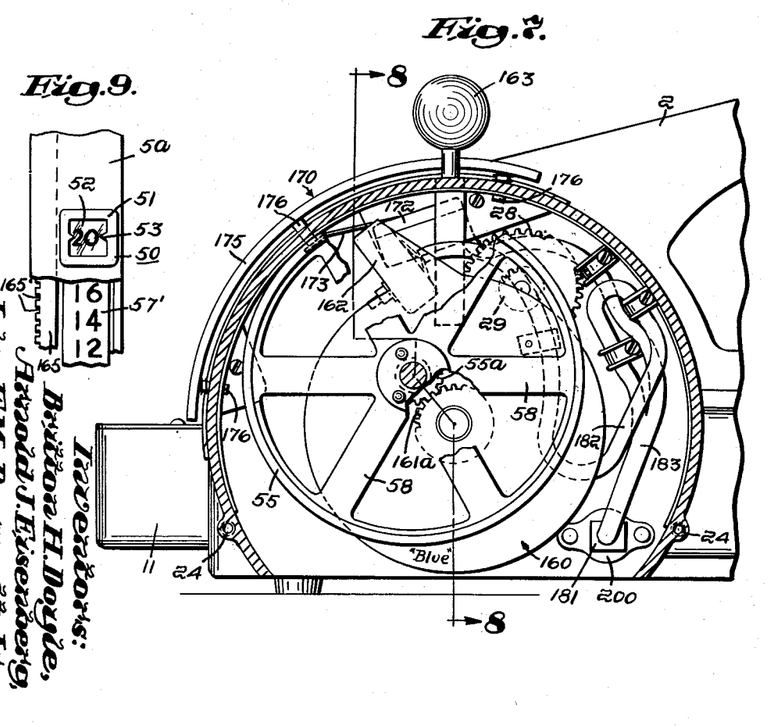
FIG. 7 is a longitudinal sectional view of the forward portion of the base machine of FIGS. 1 to 6, taken in a vertical longitudinal plane through the control housing with another of the controls installed as appropriate for rapid visual selection of any automatically measured tape length within a wide range of available lengths.
FIG. 9 is a detailed plan of the length selection window for the FIG. 7 operational phase.

Before describing in further detail the several interchangeable and variously combinable controls and accessory parts comprised in the overall apparatus embodying the invention it is to be understood that the order in which the several such phases are here considered is not necessarily significant of their relative importance, as for example the assembly of FIGS. 7 to 9 as compared with others described before or after it. The particular operational phase finding widest application in one trade area often differs from that of another trade area, speaking here of packaging and other use requirements rather than in any geographical sense. Hence what may be regarded as the more usual or "regular" operational control phase for certain customers is not necessarily that for others.

Figure 15:
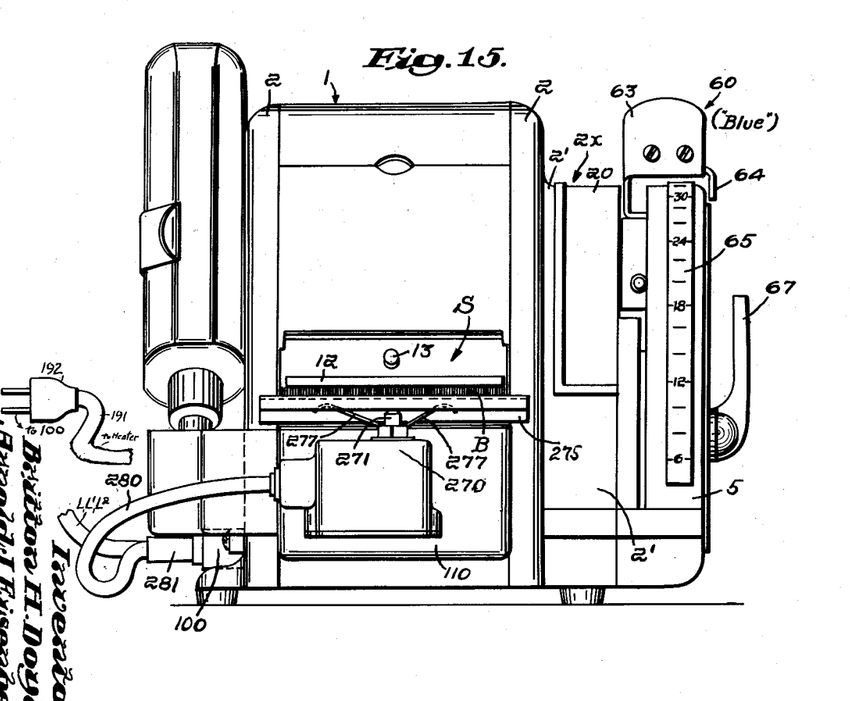
FIG. 15 is a front end view of the machine under the FIG. 14 control phase.
Figure 16:
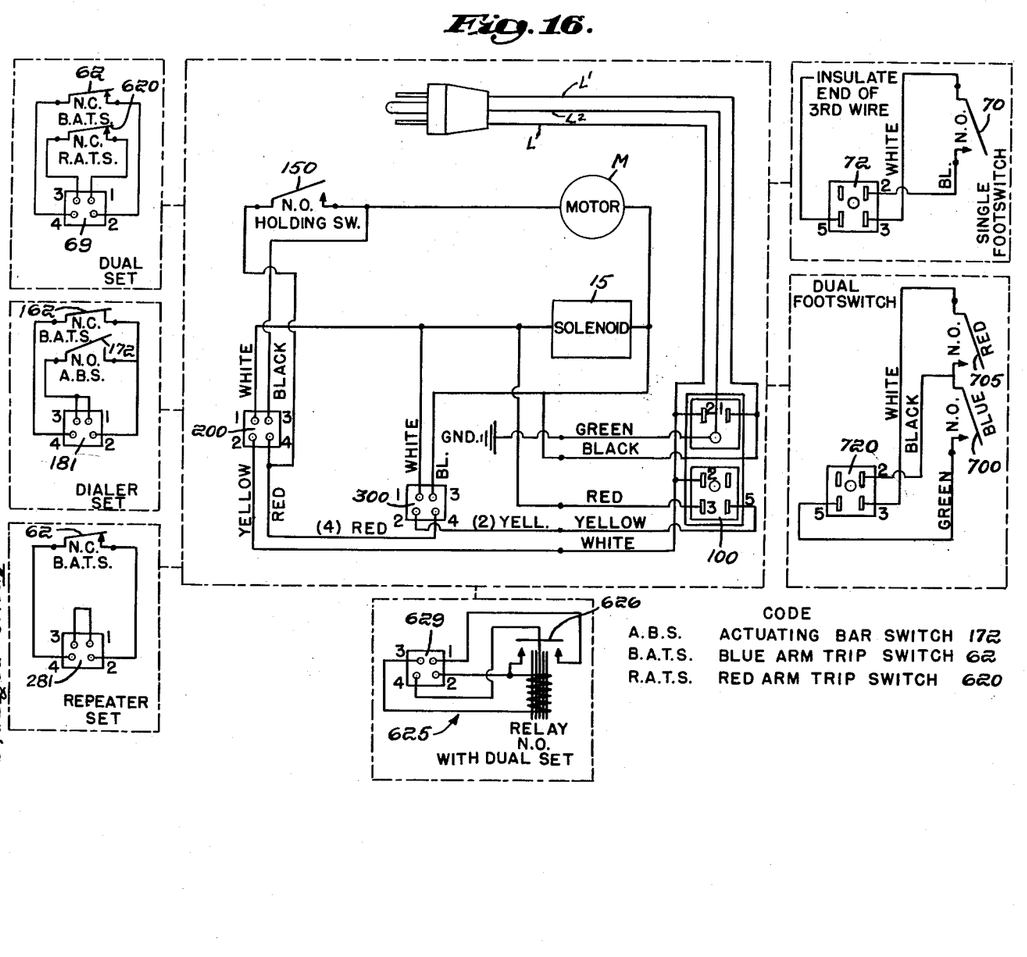
FIG. 16 is a diagrammatic showing of the controls and circuits.

From the further description in connection with the drawings and particularly the schematic circuit and controls diagram of FIG. 16, it will be seen that the general or base machine as already described additionally comprises certain associated or built-in circuitry and electric control equipment including a number of connector boxes, blocks or receptacles preferably of the prong-receiving socket type. These are accessibly located and arranged at the machine for ready plug-in connection, in fool-proof or proper-way-only hook-up, with the correlated connector plugs of the several different interchangeable operation-control sets or units comprised in the control conversion kit as a whole. The latter together with the general or base machine makes up the overall universal convertible tape-dispensing assembly or apparatus such as shown and described in the entirety of the present disclosure including all of FIGS. 1 to 16.

Figure 5:
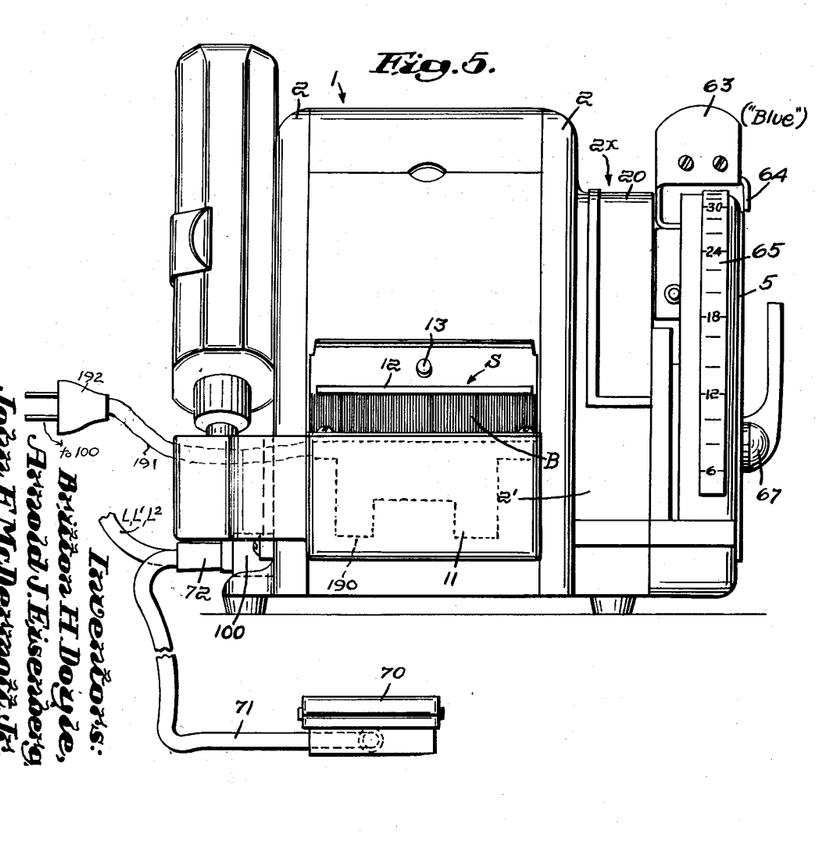
FIG. 5 is a front elevation of the base machine and controls for the selective single-length operational phase as in the preceding figures.

Such plug-in connection provisions in the illustrated example, as seen diagrammatically on FIG. 16 and in the other views as here noted, comprise first an outlet block 100, shown dotted on FIGS. 1, 3, 12 and 13 and in full line on FIGS. 5 and 15, having connected to it the A.C. power line L, L' L² and built-in ground wire and presenting three pairs of connector-prong sockets for the several hook-ups of FIG. 16, this outlet block being accessibly installed on the machine, herein near the base of the left side frame 2.

Said connection provisions further comprise a conversion sets receptacle 200 for the different feed-type controlling sets or units of the kit, noting FIGS. 1, 3, 6, 7, 8 and 12, as well as FIG. 16. This receptacle 200 in the present example is located on the right side frame 2, within the feed gear compartment, where it is readily accessible on removal of the compartment side cover 5 or 5a.

Figure 12:
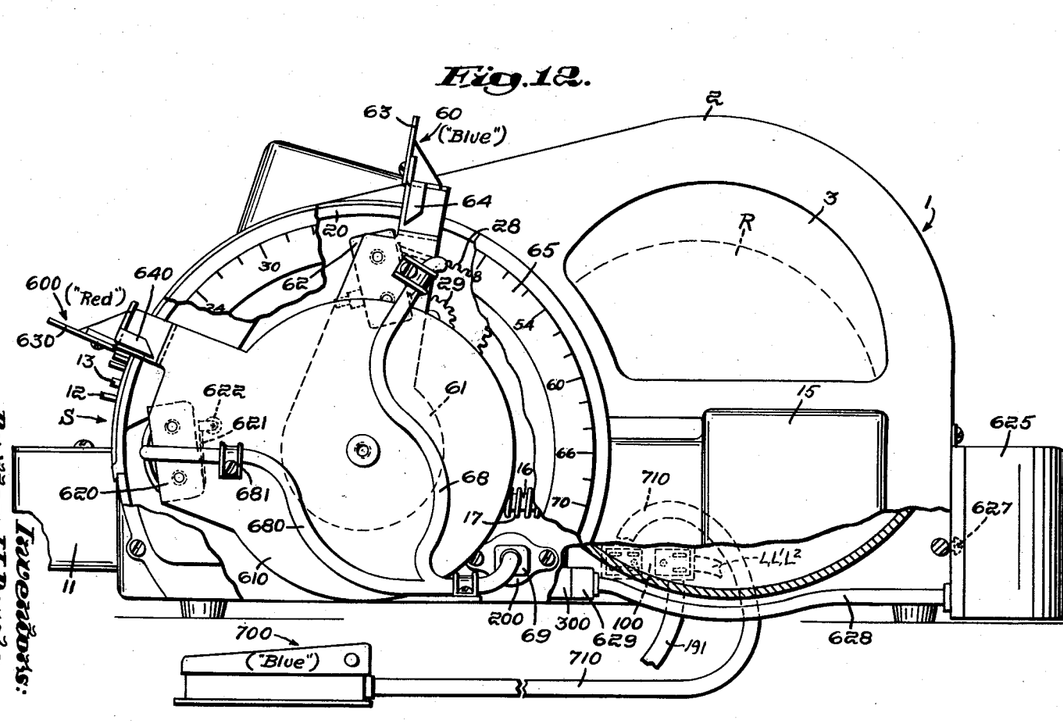
FIG. 12 is a side elevation of the base machine of the preceding views, with the control housing side cover broken away, and showing another operational phase of the machine under dual selective length control.

The connection provisions in this example further include, for convenience particularly under dual selective length operation, a junction box receptacle 300, FIGS. 12 and 16, herein mounted on and between the side frames near the base thereof at the front of the tape well 3, with the prong-receiving sockets thereof facing rearwardly.

As evident from FIG. 16 the described tape-feed drive motor M and the solenoid 15 for starting and stopping active feed of the tape by closing or opening the feed wheels 6, 7 relative to the tape path, and for operating the tape cut-off means 9 are in serial circuit with a holding switch 150 normally open and adapted to be closed to start an operating cycle as appropriate for the several different and interchangeable operation-conversion sets or feed-type control units now to be described.

Considering first FIGS. 1 to 6, these represent the described general or base machine hook-up having installed thereon what is here termed the primary or "regular" feed-type control set or unit of the total kit. Such provides for a general-purpose form of tape delivery, suitable for the generality of package uses where the tape length requirements follow no particular pattern as to long, short and intermediate lengths or the order of succession, as for instance at wrapping counters and shipping rooms where there is little or no uniformity in the individual packaging jobs.

This primary or "regular" control set or unit for such cases accordingly provides for predetermined selection of any single tape length up to the maximum for the machine, with ease of length shift after a single fed cycle or any desired number of feed cycles, and with foot-operable or other cycle-starting switch readily available to the operator for instituting a cycle. Such cycle continues to preselected tape length delivery and automatically halts, all parts returning to start position in readiness for another similar cycle.

For this purpose the primary or regular control set comprises a length selector in the form of an arm designated generally at 60, see particularly FIG. 4, also FIGS. 1, 2, 5 and 6, having a centrally apertured mounting disc 61 freely rotatably received demountably on the outer end of the stationary stud shaft 31 previously mentioned. This selector 60 carries a normally-closed length-delimiting trip or knock-off micro-switch 62 disposed, in the installed position of the selector, in the path of the finger 46 of the described length-measuring mechanism.

This control set or unit 60 for use with the base machine in the primary or "regular" hook-up thereof as in FIGS. 1 to 6 projects radially beyond the gear compartment 2x, and is disposed for movement in one and the opposite direction along an arcuate slot between the interchangeable segmental panel 20 of the compartment and the removable cover 5 of the latter. At the outer end the selector 60 is formed with a finger grip 63 and is provided with a length-selecting pointer 64 readable against one or more arcuate scales 65, 65' at the outer side face of the cover 5, FIGS. 1 and 6, and preferably also at the peripheral face thereof, FIG. 5. The scales are graduated in units of tape length according to the range of the particular machine, such for example as 6 to 7 inches.

The selector 60 is frictionally held, subject to manual shifting at the will of the operator, so as to stand at whatever feed length is selected for a given cycle. Suitable means for the purpose as shown comprise a friction plate 66 on the fixed stud shaft 31 at the outer side face of the disc 61 of the selector, the plate having a spacer collar or hub abutting the inner face of the cover 5. By means of a handled or knobbed clamping screw 67 extending through the cover plate and tapped into the end of the stud shaft 31 friction holding pressure is applied to the selector 60 through the washer plate 66.

As best seen in FIG. 4 this length selecting control set 60 of the kit thereof carries a flexible conductor cord 68 containing the appropriate electrical lead wires connected at one end to the trip switch 62 and having at the other end a prong-type plug 69 for plug-in connection at the mentioned conversion sets receptacle 200, FIGS. 1, 3, 6 and 16. The cord 68 is of appropriate length for such detachable connection with adequate slack to accommodate any position of the selector 60 along the mentioned length indicating scales 65, 65a. For additional security the cord may be anchored as by a clip 68c adjacent the end plug 69 and removably attachable to the machine frame as by a screw or the like. A similar cord-container clip 68c′ may be provided on the arm 63 adjacent the switch thereof.

It will be understood that the normally open holding switch 150 previously mentioned, see also FIG. 16, is comprised in the equipment of the base machine. It is herein shown mounted on the machine frame within the gear compartment 2x, noting the lower left portion of FIG. 3. It is connected in the circuitry as indicated on FIG. 16 through the plug-in receptacles and in manner so as to close and hold closed the main operating circuit in response to operator actuation of the cycle-starting switch 70. This holding switch 150 automatically re-sets or returns to normal open position in readiness for the next cycle, being associated with an element of the base machine that is moved in the termination of a dispensing cycle. As seen in FIG. 3 the actuating finger 151 of the switch is for this purpose operatively associated with the rocker arm 18 of the actuator 16 and with the knife operating mechanism. Said holding switch finger 151 is lifted to close the switch as the knife blade 9 is elevated to tape-path clearing position at the start of a cycle, and reversely drops to open the switch 150 attendant on the tape-severing action at the end of a cycle.

Under what is herein for convenience termed the primary or the "regular" hook-up of controls with the electrical elements of the base machine, including the motor M, the solenoid 15, the circuit-forming leads and the associated detachable-connection boxes or receptacles such as 100, 200, 300, the dispenser assembly further includes a plug-in-connective operator-controlled cycle-starting switch 70. Such cycle-starting switch 70, preferably of a quick-action or micro-type is shown as suitable either for foot or hand operation. It is supplied with a connection cord 71 of appropriate length for locating the switch in the area adjacent the machine as most convenient for the operator, as upon the floor or on a counter or the like. The starter switch cord 71 terminates in a plug 72, FIGS. 1, 3, 6 and 16, detachably connectible at the mentioned outlet block 100; see also FIG. 5. It will be understood that by reason of the holding circuit as established at the holding switch 150 in serial circuit with the motor M and solenoid 15 of the actuator the operator need only tap or apply but momentary actuating pressure to the cycle-starting switch 70.

From inspection of FIG. 16 it will be apparent that under the single-selective-length primary operational phase as illustrated and described in connection with FIGS. 1 to 6, the control means utilized in hook-up with the base machine comprises the selector set or unit of FIG. 4 and a single starter switch and plug-in connection therefor such as 70—72; also that such hook-up of the dispensing assembly is accomplished by choosing from the total kit and installing the selector set 60–69 onto the stud shaft 31, the compartment cover 5 first being removed, plugging in the selector connector 69 at the receptacle 200, and plugging in the operator-cycle-controlling switch 70 at the corresponding portion of the outlet block 100.

Turning now to FIGS. 7 to 11, these illustrate another operational phase or hook-up of the base machine with other length selector means and controls of the total kit herein available for the dispensing machine assembly. The length selector means in this instance is novelly constructed and arranged for rapid visual selection of whatever automatically measured length is desired within the available range. The selection is made at a viewing window serving as or equipped with an index opposite which the tape length values contained on a rotary movable dial are readily passed in review and the desired length value placed in set position, by manipulative release, shifting and positive-locking setting of the length selector.

Figure 11:
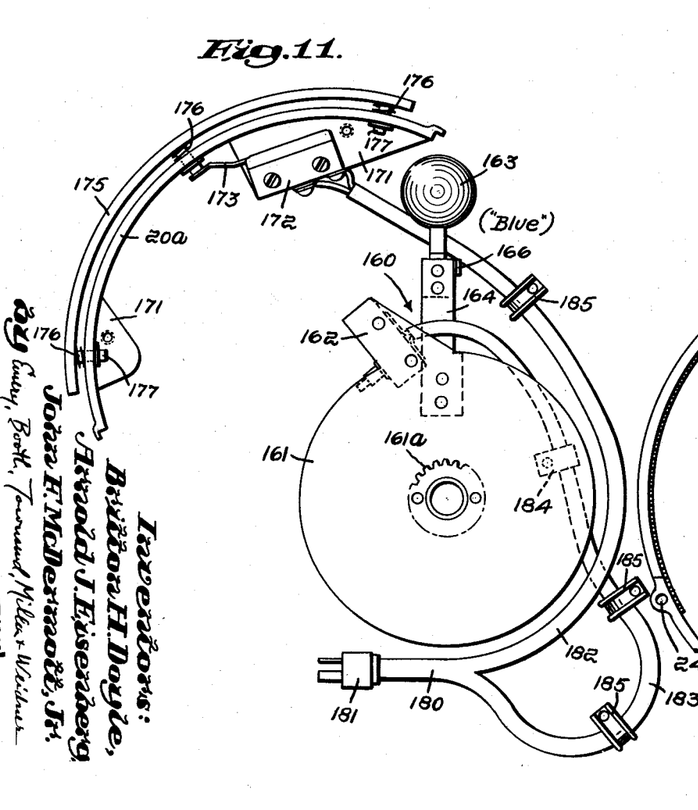
FIG. 11 is a view of the control means of the FIG. 7 operational phase showing it separately but substantially as in installed position viewed as upon the line 11—11 of FIG. 8.

In this instance the alternative length selector means 160, seen separately in FIG. 11, and the cycle-starter switch indicated generally at 170, here of a manual form with extended access provision, are together incorporated into a set or unit of a harness-like character.

This selector 160 again comprises a carrier or disc 161 centrally apertured for rotative reception on the fixed bearing stud 31. A trip switch 162 is mounted on an outer portion of the carrier disc 161 so as to present its actuating button thereof in the path of the trip finger 46, in the installed position of the parts, similarly as in the assembly of FIGS. 1 to 6. The selector 160 further comprises a radially extended manipulating portion novelly constructed and arranged for shifting movement, in addition to the rotary length-selecting movement of the selector as a whole, for locking it in and oppositely releasing it from a positively held status at whatever tape length value it may be set by the operator.

As illustrated in FIGS. 7, 8, 10 and 11 the selector disc 161 has secured to it for this purpose a generally radial arm 164 formed of a spring metal or other resilient strip of sufficient stiffness normally to stand in the laterally outwardly biased locking position, FIG. 8, but adapted to be shifted or flexed inwardly, toward the left in FIG. 8, for release of the selector for manual rotative length-selecting movement. The selector 160 further comprises a finger piece or grip 163 illustrated as a ball knob at the outer end of a rigid link 163′, the other end of which is adapted to extend into the gear compartment through the arcuate slot between the special interchangeable flange segment or panel 20a thereof and the corresponding compartment side cover plate 5a. Said inner end of the link 163′ is detachably or otherwise secured to the outer end of the flexible and resilient portion 164 of the selector manipulating arm. Outside the gear compartment the link 163′ desirably is turned laterally outward, FIG. 8, to present the grip knob conveniently and freely to the hand of the operator.

Figure 10:
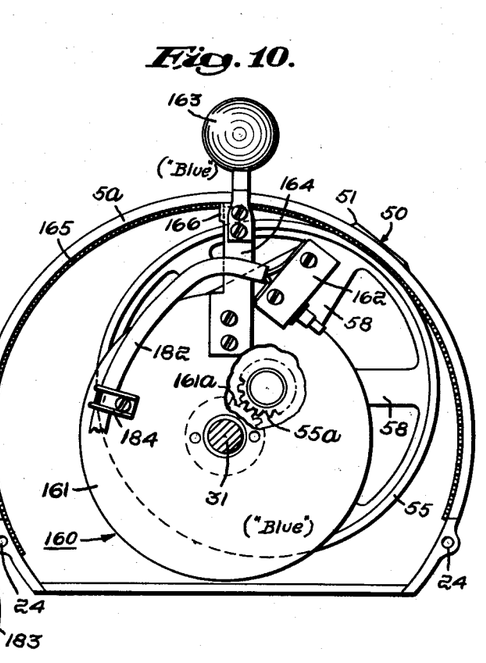
FIG. 10 is a longitudinal sectional view as on the line 10—10 of FIG. 8.

The mentioned selector locking means comprises an arcuate rack 165 at the inner marginal edge portion of the side cover 5a, concentric with the axis of rotation of the selector disc 161 on the bearing stud 31 and extending continuously about the cover over the major extent thereof as appropriate for the total range of feed length selection of the given machine; FIGS. 8, 9 and 10. Located laterally opposite this parti-circular rack 165 the selector arm 163′—164 carries a latch piece or stop 166 facing the mouths of and adapted to enter any one of the extended series of notches 165′, FIG. 9, of the rack 165. These rack notches 165′ are distributed about the rack in conformity with the tape lengths and increments as represented by the various positions on the selector-carried trip switch 162 about its rotatable axis 31.

The relative positioning of the parts is such, noting FIGS. 8 and 10, that the latching stop 166 of the selector 160 automatically enters whichever rack notch 165′ is laterally opposite it upon release of the knob 163 following shifting of the selector to the appropriate location along the rack 165 for the feed length desired. To release the selector 160 for changing the set length the operator need merely grasp the knob 163 and press laterally inward toward the machine, to the left on FIG. 8, thereby moving the resilient arm 164—163' sufficiently to disengage the locking latch 166 from the rack 165. Under maintenance of the lateral pressure the selector 160 is free to travel in one or the opposite direction along the rack to the position for the desired tape length value. Release of the knob 163 automatically re-engages and locks the selector 160 at the new tape feed length chosen. The number of notches and spacing thereof along the rack 165 may be calibrated along it to afford any desired increments of tape length, such as 1 inch or inch fractions, a typical range as in the illustrated example being from say 4 to 72 inches in half-inch, one inch or other increments.

The location of the selector finger gripping portion 163—163' circumferentially of the cover plate 5a and the rack 165 thereon is indicative of the feed length set at any given time and hence may be read as a length indicator against a stationary scale as in the previous FIGS. 1 to 6. However, speed and accuracy of operation is herein markedly improved by the provision of novel means whereby the operator is enabled to view the value of, and to make any desired length selection at a single fixed viewing location upon the machine. For maximum access and convenience in viewing, such location is that directly facing the operator when at or near his customary operating position adjacent the machine. In general such location is at the front of the machine near the tape delivery station S thereof, as at the left in FIG. 7. Hence a highly convenient point upon the machine for visual selection of the desired length of tape is at an upwardly and somewhat forwardly directed portion of the side cover plate 5a, at about the 10 o'clock to 11 o'clock position looking at the right side of the machine, FIG. 7 or FIGS. 1, 3, 12, 14, and noting that FIG. 10 is a sectional view looking in the opposite direction and hence showing the length-selective viewing location at about 1 to 2 o'clock.

Accordingly in the illustrated example of FIGS. 7 to 11 the special side cover 5a is formed with a length-viewing and indexing window 50. This comprises a through aperture in the infacing lateral flange of the cover 5a, FIGS. 9 and 10, desirably with a detachable or other surrounding bezel 51 mounting a transparent cover or non-breakable "glass" 52 and presenting thereat a length index or pointer means as at 53. The window as shown is proportioned and arranged to frame centrally thereat any one selected length value indication, herein one of the numbers 57' of the rotary dial or drum 55 to be described. Thus the window itself serves as a general index.

For presenting in viewing position at the window 50 indications or readings of the tape length numerical values for the different settings of the selector 160 over the entire available range, such as 4 to 72 by two-inch increments, the parts kit for the instant machine assembly further includes the mentioned length-values drum or dial 55. This is herein mounted in outboard fashion relative to the base machine, upon a bearing boss 56 affixed at the inner face of the cover plate 5a, eccentrically to the pivot axis of the selector 160 on the stud 31 of the base machine. The number drum 55 comprises a barrel or rim portion 57 connected as by a spider 58 to a central tubular hub 59 carrying concentrically with it a gear 55a. The drum hub is rotatively received on the cover boss 56. The entire drum 55 including the number barrel and said gear 55a thereon is shown integrally formed as by molding of a suitably rigid preferably light-weight material such as nylon or other plastic having anti-friction properties and quietness in operation.

For operation of the length-indicator drum 55 the disc 161 of the selector 160 has fixed at its outer face, see particularly FIG. 11, a ring gear 161a concentric with the selector mounting axial aperture and adapted to mesh with the gear 55a of the numbers drum or dial 55 in the installed position of the parts. The peripheral flange 57 of the drum 55 as mentioned carries numerical indicia 57', FIGS. 8 and 9, uniformly distributed about it, designating for example tape length values in increments of two inches, over the total available length range for the particular machine. As stated, the spacing, size and arrangement of the numerals preferably is such, as indicated in FIG. 9, with relation to the window 50 that the drum numbers are centrally framed at the window individually when brought opposite thereto by manual rotation of the selector 160 in one or the opposite direction.

Thus by observing only the one fixed location upon the machine, as represented by the window 50, the operator need not stop, stand on tiptoe, crane his neck, or make other special effort to see different portions as of a fixed circular scale in order to make a length selection. By contrast, in the dispensing assembly of FIGS. 7 to 11, the operator is enabled to pass the entire array of numeral length values in review at the one fixed observation station presented by the window 50. This results in substantial saving of time and effort in the use of the machine.

It is noted that the interchangeable parts set or unit comprising the cover 5a, the locking rack 165 and the numbers drum 55 with its operating gear 55a make up a unitary sub-assembly readily installable upon the base machine in place of the cover 5 of FIGS. 1 to 6. As compared with the latter, the cover 5a of the FIGS. 7 to 11 phase of the dispensing apparatus has its windowed flange sufficiently deeper, laterally of the machine, to afford outboard accommodation for the numbered drum and associated parts.

Referring again more particularly to FIG. 11, also FIGS. 7, 8 and 10, the harness-like equipment set or accessory unit of this FIGS. 7 to 11 assembly aspect further includes the extended-access manual cycle-starter switch device 170 already mentioned. This comprises a support herein provided by the interchangeable segment or panel 20a earlier referred to, structurally corresponding to and installable on the base machine in lieu of the flange segment portion 20, FIGS. 3, 5 and 6. On one of the depending attaching webs 171 of said segment 20a is mounted the cycle-starting switch proper 172, corresponding to the mobile switch 70 of FIGS. 1 to 6.

The switch-operating finger 173 is located below a central portion of the support segment 20a. At the outer face of said segment 20a and normally in spaced generally parallel relation to it is the manual push-plate, depresser or actuating bar 175 having a protracted length substantially coextensive with the front and top area of the machine adjacent the delivery station S. This actuating bar is so mounted that a slight inward pressure applied at any point along it will move the bar 175 to actuate the normally open switch 172. For this purpose said actuating bar 175 is in effect floated resiliently opposite the support segment 20a as by a series of coil springs 176 respectively surrounding radial guide pins 177 on the bar 175 and extending through corresponding apertures in the support segment 20a, with retainer heads at the inner face thereof. A central guide pin 177 is located opposite the free end of the mentioned switch finger 173 so as to depress the latter and close the switch 172 in response to operator finger pressure applied anywhere along the actuating bar 175.

The harness-like combined length selector and cycle-starter switch set or unit 160—170 of FIGS. 7 to 11 further comprises the appropriate circuit-forming connections and provision for detachable plug-in installation at the conversion-sets receptacle 200 of the base machine. Such connections as best seen in FIG. 11 comprise a cord 180 with four-pronged plug 181, the cord having branches 182, 183 each carrying a pair of leads and being connected respectively to the trip switch 162 of the selector 160 and to the cycle-starter switch element 172 of the manual extended-access operator's switch 170. As in the earlier assembly the cord branch 182 for said switch 162 of the rotatable selector 160 is of a length including appropriate slack to accommodate the full range of movement of the selector and is intermediately held on the selector disc 161 as by a detachable clip 184. Other similar cord-retaining clips 185 attachable as by screws to the machine frame or gear compartment wall hold the cord branches 182, 183 in installed position out of the path of moving parts.

From the foregoing in connection with the drawings it is apparent that this alternative installation of FIGS. 7 to 11 affords a visual dialer-type controls phase operational assembly upon the base machine. Such dialer assembly comprising the described interchangeable parts available in the accessory kit is readily installed. Starting for example with the FIGS. 1 to 6 assembly a change-over to the viewing dial or "Vuematic" assembly of FIGS. 7 to 11 is accomplished by removal of the gear compartment flange segment 20 of FIGS. 1 to 6 and replacement of the latter by the starting switch supporting segment 20a. The positive-lock form of selector 160 is installed on the positioning bearing stud 31, and the cord connector plug 181 is plugged in at the controls receptacle 200. This alternative assembly is completed by substituting the gear compartment cover 5a having the "Vuematic" index window 50 and number-carrying drum or dial 55 in place of the cover 5 of the previous assembly. It is noted in connection with both such covers that similarly located screw-bolt-receiving lugs and matching tapped apertures therefor on the machine frame are provided as at 24, 24, noting the lower side portions of FIGS. 1, 3, 7 and 10.

Figure 13:
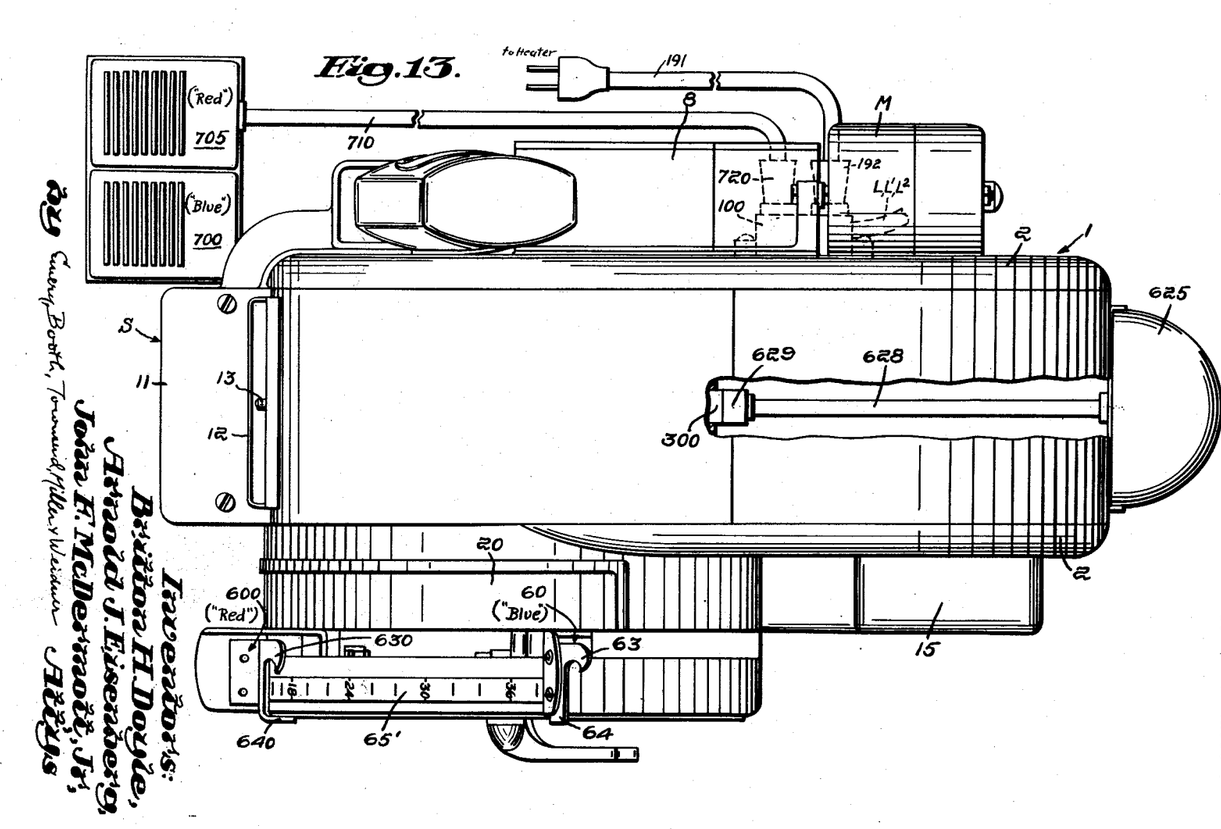
FIG. 13 is a plan view corresponding to FIG. 12.

Turning now more particularly to FIGS. 12 and 13 these represent another controls phase or assembly of elements of the accessory kit so as to afford dual length selection. Under this aspect of the invention the operator is enabled to preselect any two tape lengths within the available range, such as 18 in. and 42 in., 10 in. and 56 in., 24 in. and 72 in., 30 and 36 in. or whatever may be the requirements for a given taping usage. As earlier noted, the call for tape in dual lengths frequently occurs for example where a large number of packages of generally uniform size and shape are to be handled, requiring one or more relatively longer lengths for the longitudinal extent or other dimension of the package.

Accordingly the dispensing assembly of the invention in that arrangement of the accessory kit elements as illustrated in FIGS. 12 and 13 provides for such dual length selection. The same base machine in this instance is alternatively or additionally equipped with dual length selector means and with corresponding dual feed cycle-starting control switches, respectively identified with the preselection of two different tape lengths, each of which is instantly available on call by the operator.

For the greater convenience of the operator the exposed manual gripping portions of the two selector arms of this dual assembly are made readily distinguishable both positionally and visually as by relating them as "front" and "back" as to location and by giving them indicia such as different and distinctively contrasting colors, for example red and blue. Likewise the dual starter switches are correspondingly distinguished as to position, such as "right" and "left," and also visually by indicia such as by contrastingly coloring them or prominent areas thereof. Preferably the indicia for the given selector and for the starter switch cooperating with it are matched. Thus in the mentioned example the color red is used for the switch which controls the cycle for the shorter length "Red" selector, and blue for the other control switch for the longer length "Blue" selector.

In said FIGS. 12 and 13 dual-length assembly the base machine is that of the previous views, the same reference numerals designating the like parts, including the selector set connector receptacle 200, the starter switch and power outlet block 100 and the junction box 300 with the circuit connections thereat as in FIG. 16. One of the two length selectors for this dual assembly is that as already described, and may be either that of the primary assembly of FIGS. 1 to 6 or of the dialer set of FIGS. 7 to 11. For the purposes of illustration the selector for the longer lengths is shown as the parts set or unit 60 of FIGS. 1 to 6, installed similarly as in said figures and utilizing the gear compartment side cover 5 and the length scales 65, 65' thereof along with the regular flange segment 20. For identification and convenience in description this selector arm will be referred to as the "Blue" selector and it is assumed that the distinctive color applied to the exposed area thereof as at the grip 63, in the manner already explained, is the color blue, though of course any other color contrasting with that of the second selector to be described may be used.

In the illustrated example of FIGS. 12, 13, either of two lengths is made available to the operator, each such length being settable within the available length range as appropriate for the particular use requirements. For this purpose the accessory kit comprises a second selector designated generally at 600 and at times herein referred to as the shorter length or "Red" selector. It comprises a centrally apertured carrier disc 610 generally similar to that of the first or "Blue" selector 60 of the preceding views. It is adapted for rotatable installation on the fixed bearing stud 31 of the base machine in place of the friction plate 66. On this selector 600 is a trip switch 620 at a radial location outside the path of the driven length-measuring projection 46. Facing the latter the trip switch 620 has a yieldably-mounted actuating finger 621 carrying an actuator roll 622 in normal position to be engaged by said measuring projection 46 for shifting the switch from its normally closed condition, FIG. 16 to open position.

This "Red" selector 600 has a finger grip 630 extending outside the gear compartment of the machine and a pointer 640 readable against the length values scale 65 similarly as for the first and longer length "Blue" selector 60. It will be understood that the two different preset lengths of tape thus made available to the operator are each variable along the scale. At times both lengths may lie within the lower portion of the scale, at other times both may be within the upper scale range, or the shorter length may be in the lower part of the range and the longer length in the upper part. Thus the differential between the two lengths is variable preselectively to suit the particular use.

In this dual selection accessory set the tape feed cycle for each length is separately controllable by the operator, selectively, each by its own cycle-starting switch. These switches are shown as of a mobile foot or hand operable form preferably on a common pad, FIG. 13, presenting a longer length "Blue" starter switch 700 similar to switch 70 of the FIGS. 1 to 6 assembly, and a shorter length "Red" starter switch 705. The electrical leads for both switches are contained in a conductor cord 710 having at the remote end a four-prong plug 720, FIG. 13, connectible at the four-wire portion of the same outlet block 100 of the base machine already described; see also FIG. 16.

For this dual length selection and dual cycling assembly of FIGS. 12–13 the control circuits include provision herein associated with the mentioned leads junction box 300 on the base machine, whereby the shorter lengths or "Red" selector 600 stands with its switch 620 normally closed in readiness for length-measured cycle-stopping control of a shorter length feed cycle to be started by actuation of the shorter length or "Red" switch 705 by the operator; whereby also the longer length or "Blue" cycle terminating at and by the normally closed cycle-stopping switch 62 of the "Blue" selector 60 stands readied to function in a longer length cycle to be started by the "Blue" starter switch 70; and whereby further the effect of the shorter length or "Red" cycle-stopping trip switch 620 is automatically cancelled when a longer length cycle is called for by the operator by actuating the "Blue" starting switch 700.

In the example as shown in FIGS. 12, 13, 16, such cancelling or by-passing of the shorter "Red" cycle-ending control during a longer "Blue" cycle is accomplished as by installing on the base machine a "Comar" or equivalent relay unit 625 having a normally open magnet-operable switch 626, FIG. 16, with dual circuit leads connected through a four-wire cord 628 to a four-terminal plug 629 receivable at the machine junction box 300. It is understood with reference to FIG. 16 that the terminals numbered 1, 2, 3, 4 of plug 629 match respectively with the like numbered leads 1, 2, 3, 4 of the junction box when the plug-together connection is made thereat. The same applies also to the other detachable plug-and-socket type connections shown on and described with reference to FIG. 16, namely the terminals 2, 3, 5 of the single and the dual cycle-starter switch cords and plugs 72 and 720 for reception at the outlet box 100, at the right portion of FIG. 16, and the terminals 1, 2, 3, 4 of the different cycling controls and the connectors 69, 181 and 281 thereof with respect to the selector sets receptacle 200, at the left portion of FIG. 16.

Said relay unit 625, referring again to FIGS. 12, 13 and 16, is conveniently installed at, and may be stored on, the base machine as at the rear thereof as by one or more mounting screws 627, FIG. 12, received in keyhole slots at the adjacent face of the relay unit. For the dual length selection assembly, noting particularly FIG. 16, the connector element 720 of the dual switch unit 700, 705 is applied at the outlet box 100, the relay connector element 629 is applied at the junction box 300, and the dual selector set has its connector element 69 applied at the sets receptacle 200.

Assuming the "Red" and "Blue" selectors 600 and 60 respectively set for the desired two different tape lengths, automatic feed, moistening, cut-off and delivery of the shorter tape length is had by foot or hand closure of the "Red" cycle-starter switch 705. When the rotary measuring projection 46 comes opposite and engages the actuator roll 622 of the "Red" arm trip switch 620, said normally closed switch is thereby opened and the feed cycle halted by deenergizing of the actuator solenoid 15, with stopping of the motor and return of the holding switch 150 to normal open position attendant on the cut-off operation under the return movement of the actuator 16 to normal released position.

Under the same dual length assembly, delivery of the selected longer tape length is had by operator closure of the "Blue" cycle-starter switch 700. The normally open relay switch 626 is thereby closed, along with the holding switch 150, and through the illustrated relay circuits and lead connections through the junction box 300 the "Red" trip switch 620 is in effect shunted out or cancelled from the then active circuits. Hence the movement of the driven measuring projection 46 past said "Red" trip switch 620 although engaging and moving the switch actuator roll 622 has no cycle-halting effect thereat and the feed cycle continues on until said projection 46 engages and trips the "Blue" arm trip switch 62. Thereby the tape feed is halted at the longer tape length corresponding to the location of said switch 62 under the particular selective setting of the "Blue" selector 60.

Figure 14:
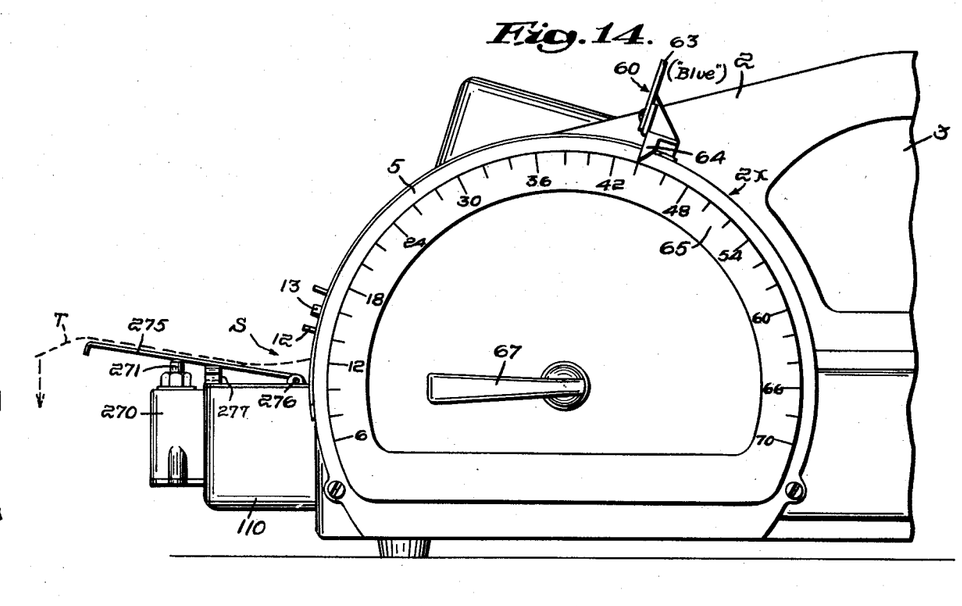
FIG. 14 shows in elevation the forward portion of the same machine in a further operational phase including a control of the group thereof affording automatic repeat cycling.

In another operational phase or assembly aspect of the interchangeable accessory kit of the tape dispensing apparatus of the invention provision is made for automatic repeat cycling, through cycle starting control means operable upon completion of each cycle. In the embodiment thereof as shown in FIGS. 14 and 15 on the same universal base machine and with the circuitry and controls of FIG. 16 such repeater control set is constructed and arranged for re-cycling by and in response to the removal from the machine of the last preceding tape length T fed, moistened, severed and held available at the delivery station S of the machine; FIG. 14. The transverse cut-off line at the movable and fixed blades 9, 10, as shown in FIG. 3, being rearwardly of the brush or capillary moistener means B of the moistening fluid reservoir, designated as 110 in FIGS. 14, 15, the trailing end of the delivered tape length is held by and between the moistener and the overlying weighted guide platen 12, 13. Such holding is availed of to enable the operator to tension and deflect the tape length downwardly, in the direction of the arrow on FIG. 14, by applying a slight down draft in grasping and taking the tape for use.

Accordingly as illustrated in FIGS. 14 and 15 along with FIG. 16 there is mounted on the reservoir 110 below the path of the tape T, shown in broken line, where it issues at the delivery station S, a repeat-cycling switch 270 preferably of the micro-type and having an actuator plunger or button 271 located for actuation vertically under slight downward pressure. This switch 270 is normally open, similarly as the foot or hand single cycle-starting switch 70 of FIGS. 1 to 6 and the upper right panel of FIG. 16.

Above the switch button 271 is a switch actuator plate 275 pivoted at a rear portion as at 276 on the cover of the reservoir 110 for downward deflection to actuate the switch 270. This actuator plate 275 is held elevated as by a yoke-shaped two-arm leaf spring 277, also on the cover of the reservoir 110. As best seen in FIG. 14 the actuator plate 275 lies substantially horizontal, below the path of the tape T coming from the machine at the delivery station S, and projects forwardly beyond the reservoir 110 and switch 270 so that the presented length of tape T drapes downward over the front edge of the actuator plate 275. The latter is constructed and arranged with reference to the spring 277 and the switch actuator button 271 so that the actuator plate 275 normally rests closely above the switch button, with the weight carried and the plate elevated mainly by the leaf spring 277. The latter is made adequate to elevate said actuator plate and maintain the normally open status of the switch 270 under whatever maximum length of tape may be selected within the range of the machine. Only a short delivered length of tape T appears on FIG. 14 under the space limitations of the drawing.

This delivered tape T will be understood as having been pre-selected as to length as by the selector 60, fed, adhesively conditioned by the moistener means B at the reservoir 110 and severed behind the delivery station by the movable and fixed blades 9, 10, FIG. 3. As above explained, the tape is retained at the delivery station S until removed for use by the operator, the trailing portion of the delivered length being frictionally held between the moistener B and the overlying weighted guide platen plate 12, 13. In taking such tape length T from the machine the operator grasps it outwardly beyond the actuator plate 275 and applies a positive downward pull which is resisted by the described holding of the trailing end of the severed tape on the machine. Thereby the actuator plate 275 is deflected downwardly, sufficiently to depress and close the normally open automatic repeat cycle-starting switch 270. Thus the next succeeding feed cycle is automatically started on and by removal of the precedently delivered tape length, without further attention by the operator.

As apparent from FIG. 15 in connection with the controls and circuits diagram of FIG. 16, the described feed cycle repeater set including the reservoir 110 and switch and actuator parts 270—277 thereon is adapted for plug-in connection through the leads cord 280 and plug 281 receivable at the switch section of the outlet box 100, in similar manner as the plug 72 of the single-cycle switch 70 at the upper right of FIG. 16. The repeat-cycling assembly under the hook up of FIG. 15 will be understood as including a length-selector such as the "Blue"

trip-switch-carrying selector 60 of FIGS. 1 to 6 or of the dial type 160 of FIGS. 7 to 11. The selector set 60 with trip switch 62 and connector plug 69 is shown installed in the assembly of FIGS. 14 and 15 by way of example. The circuits and wiring connections in this assembly are the same as for the single foot switch control phase of FIGS. 1 to 6, again with a jumper connection across the terminals 1, 3 of the plug for the cycle-ending switch 62 as indicated on the selector-set panel at the lower left corner of FIG. 16. Said panel, while marked "repeater set" represents also the circuitry for the single-cycle assembly of FIGS. 1 to 6 (not repetitively shown on FIG. 16), and includes the shorting jumper across terminals 1, 3. Otherwise stated, the length selector portion of the circuit for the repeater assembly of FIGS. 14, 15 and for the single-cycle assembly of FIGS. 1 to 6, both of which employ a "single" cycle-starter control circuit as at the upper right panel of FIG. 16, are similar as shown at the upper left panel FIG. 16 for the dual set but with the "Red" (shorter length) trip switch 620 omitted and the jumper substituted across terminals 1, 3. In each of these instances the interchangeable assembly, as to the length-selector circuit, is effected by plug-in at the sets receptacle 200.

It will further be understood that the several accessory control sets as here illustrated and described, both those at the left margin of FIG. 16 and concerned mainly with the selective-length feed cycle terminating controls and for which the detachable connection is made at the receptacle sets 200, and those at the right margin of FIG. 16 representing the cycle-starting controls and for which the detachable connection is made at the switch section of the outlet plug 100, may be employed in different assembly combinations upon the base machine. For example, the dialer and rotary length gauging drum selector set of FIGS. 7 to 11 may be employed with the single foot switch control 70 of FIGS. 1 to 6 either in lieu of or in addition to the manual actuating bar switch 72 of FIGS. 7 to 11. Or the dual selector controls of FIGS. 12, 13 may be of the window and rotary dial "Vuematic" selector form of FIGS. 7 to 11 with individual length-dialing drums such as 55 for each of the two selectors including dial-operating outboard gearing for the mounting discs 610 and 61 of the two selector arms of FIGS. 12, 13 similarly as for the single selector 160 and length gauging dial 55 of FIGS. 7 to 11. Further, certain of the parts sets may be stored or left installed upon the base machine at times when they may not actually be required for the particular operational phase preferred for a given tape dispensing job. Assume for example that the machine is assembled as for dual length selection, FIGS. 12, 13, and the operator meets a use condition requiring in succession a large number of tapes of the same length, perhaps of an intermediate length value in the total available range. He may elect to use either the "Blue" selector 60 or the "Red" selector 600, shifting the one not elected to out-of-way position at its end of the length scale or dial. Assuming that the "Red" selector 600 is chosen, the relay unit 625 may remain assembled upon the machine, whether plugged in at or disconnected at the junction box 300. Likewise should he so wish the operator in thus using only the "Red" selector 600 of FIGS. 12, 13 for single length control may unplug the dual foot switch unit 700—720 and substitute the single switch unit 70—72 as for FIGS. 1 to 6. Other combinational uses for the accessory kit as a whole will be apparent.

As seen in FIGS. 1, 3, 12, 13, 15 and 16 the connector receptacle herein referred to as the outlet plug 100 comprises a switch-connecting section as at the left in the first enumerated views and at the lower position of FIG. 16, and adjacent to it upon the same plug 100 an outlet section termed for identification the "heater section" or side of the plug. This is conveniently provided for plug-in connection of other electrical means upon the base machine, such particularly as the moistening fluid heater element 190 for the reservoirs 11 or 110; see FIG. 5. For many tape moistening uses and locations including those subject to refrigeration or other low temperature conditions, and at other times with special fluids, it is desirable that the fluid in the moistener reservoirs for adhesively conditioning the tape be supplementally heated, to maintain it substantially at or above ordinary room temperature. For this purpose the tape dispensing equipment desirably includes a sealed submersible electrical resistance-type heater such as shown demountably installed at 190 in the tank 11 of FIG. 5 and applicable also to the repeat cycling tank 110 of FIGS. 14, 15. Installation is accomplished as by removal of the tank cover plate and setting the heater 190 into the fluid containing compartment.

Such heater as shown in FIG. 5 has a conductor cord 191 and plug 192, with independent on-off switch in the cord if desired (not shown). This plug is adapted for detachable connection at the mentioned "heater side" of the outlet block 100. Such heater cord 191 is seen also on FIGS. 1, 3, 12, 13 and 15. It will be evident that the "heater side" of the outlet block also is available for alternative installation of other electrical accessories for the machine such for example as an inspection light.

It will be understood that our invention is not limited to the particular embodying structure illustrated and described herein, and we set forth its scope in our following claims.

We claim:
1. In an apparatus for feeding from a tape roll supply and delivering operator-selectable lengths of adhesively-conditioned tape,
   a housing frame with side members presenting between them a path for the tape from the supply to a delivery station, said frame mounting normally open tape feed rolls and a motor to drive one of them,
   an electrically operable actuator on the frame for closing the rolls to feeding relation,
   a tape length measuring element rotatable about the axis of a transverse bearing stud on the frame and connected for rotative movement with one of said rolls proportionately to the tape length fed,
   tape length selector means rotatably mounted for various angular positioning within a substantial range of arc about the axis of said bearing stud according to the tape feed lengths desired,
   and electrical means providing for controlling the starting, the running and the ending of tape-length delivery cycles for delivering tape in lengths variously selectable by the operator,
   said electrical means comprising a power-supply-connectible outlet box on the frame, a starting circuit including at least one operator-actuable switch removably connectible at said outlet box and a holding switch on the frame for actuation by said operator-actuable switch,
   said electrical means further comprising a running circuit for operative conditioning by said holding switch and including in series therein said roll-closing actuator and a trip switch for interrupting said running circuit upon delivery of the selected tape length,
   said trip switch and a tripper therefor being interengageably mounted one on said length selector means and the other on said length measuring element and having capacity for automatic return to length measurement starting position at the end of each delivery cycle,
   and said electrical means also comprising a further plural-point electrical connection receptacle on said frame and having connections to said outlet box on the frame and other connections adapted for readily disconnectibly establishing said running circuit so as to include said selector-associated trip switch and to accept like readily disconnectible connection with other length-selector-mounted running-circuit-interrupting switch means for another manner of cycle control.

2. Apparatus according to claim 1 wherein one side member of the frame has a lateral flange of arcuate contour generally concentric with the axis of said bearing stud and has flange-matching demountable side cover means which flange and cover means define a compartment containing major portions of said measuring element and said selector means and having a circumferential slot for external extension of the selector means therethrough for manual engagement, said compartment containing said electrical connection receptacle and the disconnectible connections to said selector-associated trip switch in readily accessible position upon demounting said side cover means, said outlet box for power-supply and operator-actuable switch connection being accessibly mounted on said housing frame externally of said compartment, and said compartment carrying length indicating means cooperable with the selector means for determining the desired setting thereof within said substantial range.

3. Apparatus according to claim 1 wherein said length selector means comprises at least two rotatable members concentric with said stud axis and individually positionable within said arc range for selection of different tape lengths respectively, said starting circuit including therein an operator-actuable switch for each such length-selecting rotatable member, and said running circuit including therein a circuit-interrupting trip switch for each such length-selecting rotatable member, and the housing frame being equipped with a demountable relay switch device and readily disconnectible circuit connections therefor so connectible into the respective starting and running circuits that operator starting of a delivery cycle for a relatively long selected tape length as selected by one of said rotatable members thereby automatically renders inoperative the circuit-interrupting trip switch associated with another of said rotatable members then positioned for a lesser length selection.

4. Apparatus according to claim 2 wherein said demountable side cover means comprises a plate having at the side toward the frame a lateral flange conformant with said frame flange and completing therewith the outer portion of said compartment, said flanges together providing said circumferential slot for the selector means extension, said cover plate rotatably carrying at the inner face and within its said compartment portion a cylindrical drum having a toothed gear concentric therewith, said apparatus further including toothed gear means on and angularly moving with the selector means and operatively connectible with said drum gear for proportionately rotating said drum for moving the cylindrical surface thereof in one and the opposite direction along and within said cover plate flange in proximity to an operator-facing segment in the installed position of said cover plate, said drum surface having indicia of tape length increments distributed about it, and said cover-plate flange segment having a stationary viewing window radially opposite said drum for operator selection thereat of any desired tape length value as traveled past said window under length-selective movement of said selector means.

5. For demountable installation on and use with apparatus for feeding and delivering operator-selected lengths of adhesivelny conditioned tape and which apparatus has a frame with length selector means rotatably mounted at one frame side on an axis transverse to the tape path with said means including a radially extending member for manual engagement by the operator, an accessory sub-assembly comprising a generally semi-circular side cover plate with a co-extensive lateral flange defining with said plate a compartment outboard of the apparatus and substantially vertical and in central relation to said selector means axis in the installed position of said sub-assembly, the latter including a cylindrical drum rotatably mounted at the inner face of said plate and within said compartment and having drive gear means for operative connection with said length selector means, the cylindrical surface of said drum being in proximity to and generally conformant with the inner wall of said plate flange, said drum surface having indicia of tape length increments distributed about it and said cover-plate flange having at an operator-facing segment thereof a stationary viewing window for visually exposing to the operator seriatim and in restricted number at any one time said length increment indicia as traveled in said compartment and past said window under length-selective movement of said selector means by operator engagement of said radially extending member.

6. Apparatus according to claim 1 wherein said operator-actuable switch of said starting circuit of said electrical means is supported on said apparatus frame adjacent said tape delivery station, said delivery station having associated therewith means adapted for retentive engagement of the trailing end of each tape length presented thereat for delivering to and removal by the operator, and there being provided for said switch an actuator plate movably supported from the apparatus frame for switch-actuating movement by the precedently fed and retained tape length under deflection thereof by the operator attendant on removal of said tape length and whereby said apparatus is rendered operative in an automatic repeat-cycling manner.

7. Apparatus according to claim 1 wherein said outlet box on the frame includes provision for readily dismountable reception thereat of electrical conductor means for at least one other electrical accessory for said apparatus so as to render such accessory operable independently of said starting and running circuits of said apparatus.

8. In a machine of the power-operated rotary feed roll type for dispensing operator-selected lengths of adhesively conditioned tape and which machine has a frame mounting separable feed rolls with a motor to drive one of them and electrical means and an operating circuit therefor to close the feed rolls and to release them for separation thereby to start and to stop tape feed, and said frame having at one side a bearing stud defining an axis transverse to the tape path and adapted to rotatably support demountably tape feed length selector means as accessory equipment for such machine, the combination therewith of a plate having provision for rotatable mounting thereof on said bearing stud and within the compass of the machine frame, said plate having a radially projecting arm for manual engagement by the machine operator, said plate having mounted thereon a trip switch adapted to be actuated by a driven machine part upon feeding of the selected tape length as determined by the angular positioning of said plate about said stud axis, and said plate further carrying electrical conductor means with plug-in type terminal provision for connection of said trip switch into said operating circuit of said electrical means of the machine so as to effect feed stopping control thereof by said trip switch, said bearing stud of the machine being adapted further to receive and rotatably support a second generally like and similarly equipped selector plate for selecting other tape lengths and controlling the feed stopping thereof.

References Cited in the file of this patent

UNITED STATES PATENTS

| | | |
|---|---|---|
| 2,405,790 | Krueger | Aug. 13, 1946 |
| 2,719,713 | Erhardt | Oct. 4, 1955 |
| 2,776,833 | Lakso | Jan. 8, 1957 |
| 2,797,919 | Hempel | July 2, 1957 |
| 2,892,500 | Le Baron et al. | June 30, 1959 |